July 19, 1949.  M. A. BAUMAN  2,476,272
INJECTION MOLDING MACHINE
Filed June 4, 1945  2 Sheets-Sheet 1
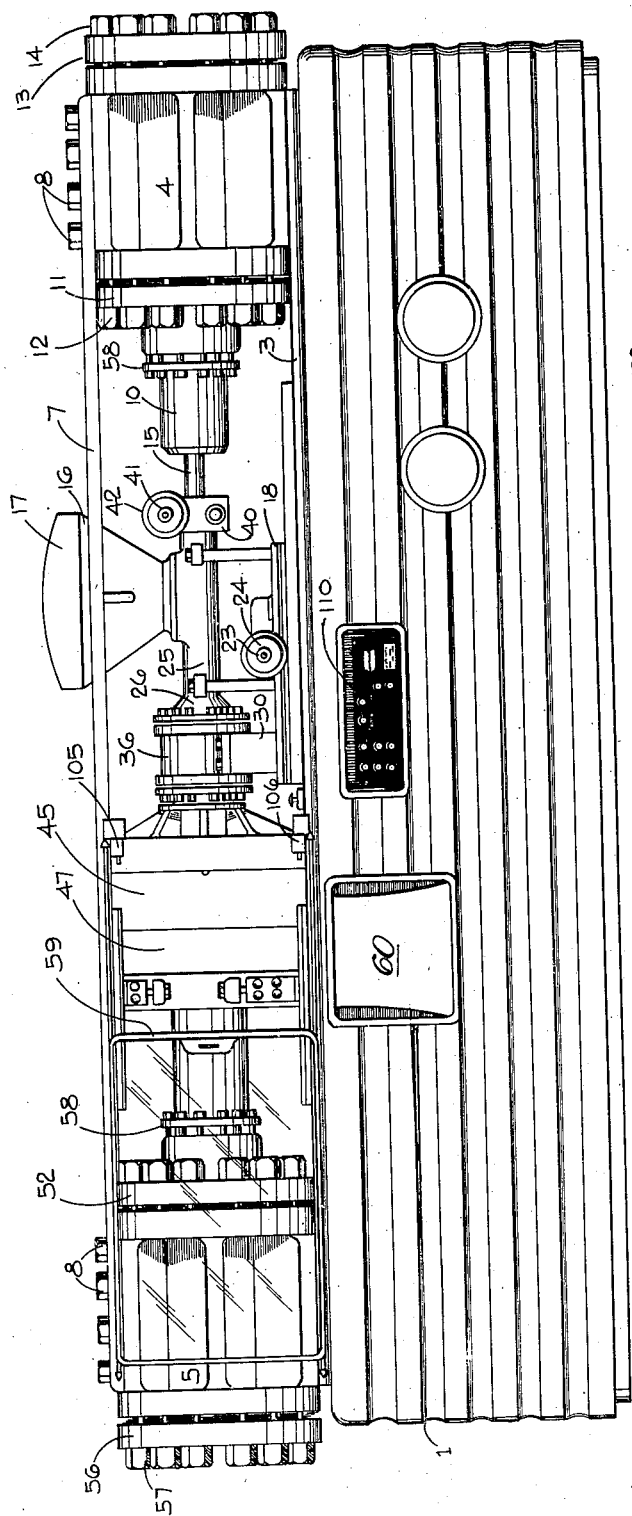
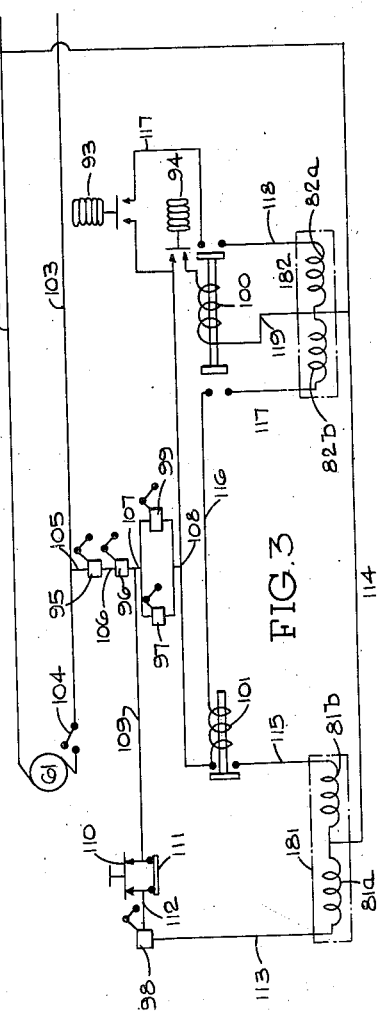
INVENTOR.
Morton A. Bauman
BY
Haygood and Van Horn
His Attorneys July 19, 1949.  M. A. BAUMAN  2,476,272
INJECTION MOLDING MACHINE
Filed June 4, 1945  2 Sheets-Sheet 2

INVENTOR.
Morton A. Bauman
BY
Haugood and Van Horn
His Attorneys

Patented July 19, 1949

2,476,272

UNITED STATES PATENT OFFICE 2,476,272

INJECTION MOLDING MACHINE

Morton A. Bauman, Cleveland, Ohio, assignor to
The Lees-Bradner Company, Cleveland, Ohio,
a corporation of Ohio Application June 4, 1945, Serial No. 597,559

2 Claims. (Cl. 18—30)

This invention relates to means for molding materials and is particularly adapted to the molding of materials which become soft and moldable upon the application of heat such as the thermoplastic and thermo-setting materials now being extensively used for molding many parts and devices.

An object of the invention is to provide an improved molding apparatus which will be extremely safe in producing molded articles.

Another object is to provide an improved molding apparatus which will be extremely simple in its operation.

Another object is to provide an improved molding apparatus which will be composed of few and rugged parts.

Another object is to provide an improved molding apparatus which may be readily and economically manufactured.

Another object is to provide an improved molding apparatus which will effectively protect the operator.

Another object is to provide an improved molding apparatus which may easily be operated.

Another object is to provide an improved molding apparatus which will be compact and occupy little floor space.

Another object is to provide an improved molding apparatus in which such parts as need to be disassembled for cleaning and the like will be readily accessible.

Another object is to provide an improved molding apparatus which will be capable of molding articles under extremely high pressures.

Another object is to provide an improved molding apparatus in which sections of the mold will be effectively maintained in closed position during the entire molding operation.

Another object is to provide an improved molding apparatus which will be neat and attractive in appearance.

Other objects will hereinafter appear.

The invention will be better understood from the description of one practical embodiment thereof, illustrated in the accompanying drawings, in which:

Figure 1 is a side elevation of a molding machine embodying the present invention;

Figure 2:
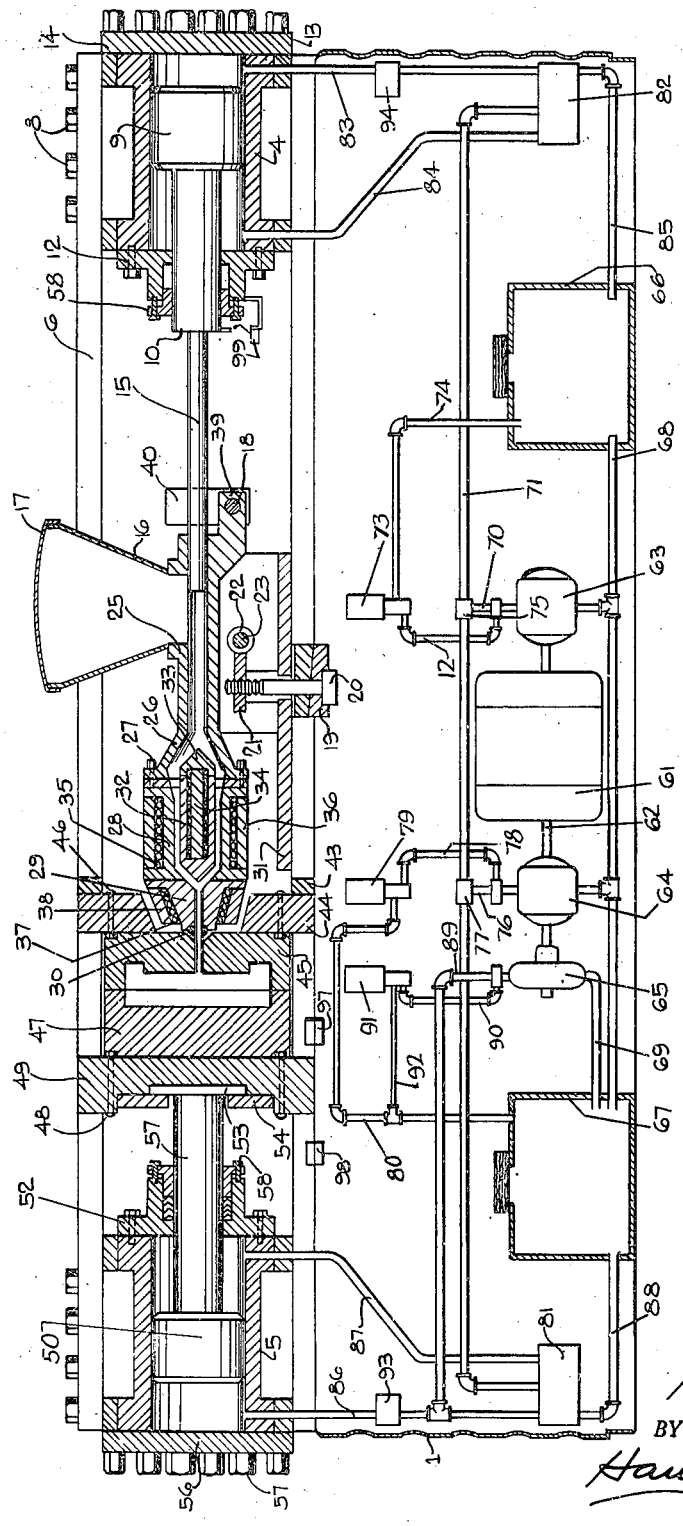
Figure 2 is a central longitudinal sectional view of the machine of Figure 1; and, Figure 3 is a diagrammatic illustration of the control valves and circuits of the machine of Figures 1 and 2.

The machine shown consists of a base, indicated generally at 1, which may be a casting or may consist of a welded frame with (or without) a protecting cover and which supports the molding apparatus and encloses the drives and controls therefor.

Positioned on the top of the bases are two lengthwise extending tie or strain bars 2 and 3, which also serve as supports and guides for various parts of the molding mechanism and control apparatus. Upon these bars, adjacent their ends are mounted two fluid pressure cylinders 4 and 5, the tops of these cylinders also being connected by two more strain or tie bars 6 and 7 secured to the cylinders as by machine screws 8.

The first mentioned cylinder 4 operates the mechanism for injecting material which is to be molded into the mold, while the second mentioned cylinder 5 is associated with the mechanism for closing and opening the mold as desired, the injecting mechanism and mold being carried by the tie bars between the two cylinders, as will be hereinafter more fully described.

Within cylinder 4 is a piston 9, having a piston rod 10 extending through the apertured head 11, secured to the inner end of the cylinder 4 by machine screws 12. A closed head 13 is secured to the opposite end of the cylinder 4 by machine screws 14.

The piston rod 10 is secured to or formed integral with an injection plunger 15, by which material is delivered to the mold.

This material is supplied by gravity through a hopper 16, having a cover 17, and carried by a carriage 18 longitudinally movable upon bars 2 and 3.

The carriage may be locked in position by means of a clamping block or bar 19 which may be drawn tightly against the underside of the bars 2 and 3 by a bolt 20, the thread of which is engaged by a thread formed in a worm wheel 21, driven by worm 22 on a shaft 23 to the outer end of which is fixed a hand wheel 24.

The carriage has formed integrally therewith a cylinder 25 in which the plunger 15 reciprocates, and through an opening in the top of which the material to be molded may drop from the hopper 16.

The cylinder 25 has flared discharge end 26 terminating in an outwardly extending flange which is attached by screws 27 to a heating cylinder 28, the forward end of which is provided with a nozzle-supporting piece 29 which carries a nozzle 30 by which the material is delivered to the mold.

The heating cylinder and associated parts are supported on carriage 18 by bracket-like supports 31.

The interior of the cylinder 28 is enlarged considerably over the cross sectional area of the cylinder 25, and in this enlarged space is positioned a somewhat fusiform or streamlined baffle or torpedo 32 provided with a detachable head 33 and having in its interior an electric heater 34.

Around the exterior of cylinder 28 is an electric heater 35 which is provided with a covering of heat insulating material 36.

A similar electric heater 37 surrounds the nozzle supporting base 29 and is in turn surrounded with heat insulating material 38.

The carriage 18, on the end remote from the nozzle, is provided with a bracket 39 carrying clamping jaws 40 which may be brought together to clamp upon plunger 15 by means of a threaded rod 41 having fixed to its front end a hand wheel 42.

Fixed to bars 2, 3, 6 and 7, as by transverse bars 43, is a vertical stationary centrally apertured platten 44, to which one mold section 45 may be secured as by machine screws 46.

Co-operating with the stationary mold section is another and movable mold section 47, fixed by screws 48 to a movable platten 49 parallel to the stationary platten and slidable along bars 2, 3, 6 and 7.

The means for moving movable platten include a piston 50 reciprocable in cylinder 5 and having a piston rod 51 extending through the inner centrally apertured head 52.

The piston rod has a head 53 clamped within a recess of the movable platten 49 as by a perforated plate 54.

It will, of course, be understood that cylinder 5 has a closed outer head 56 secured to it as by machine screws 57.

Apertured cylinder heads 11 and 52 each are provided with packing glands and packing, indicated generally at 58.

A slidable protective cover or door 59 extends in front of the mold section when the device is in operation, but can be slid to the left, in front of cylinder 5, when the operator changes or adjusts the mold parts.

The operation of the parts so far described is as follows:

Material, in granular form, is fed through the hopper 16 and drops through the bottom part of this hopper into the injection cylinder 25.

It being desired to mold articles, the carriage 18 is locked in position with its nozzle 30 engaging mold section 45 by rotation of the hand wheel 24. Door 59 is closed.

Pressure is first admitted to the outer end of cylinder 5, moving piston 50 to the right and carrying the mold section 47 tightly against mold section 45. After these sections are closed, pressure is maintained on the outer end of piston 50 until the molded article has been finished, this pressure, of course, exerting greater force than that which will be exerted by the material within the mold tending to open the sections.

After the mold sections have been closed, pressure is admitted to the outer end of cylinder 4, moving piston 9 to the left, and thus carrying plunger 15 into the injection cylinder 25.

In passing the bottom of the hopper 16, the plunger carries before it a charge of granular plasticizable material, the stream of this material dividing around the end 33 of the torpedo and passing between the heated outer surface of the torpedo and the heated inner surface of cylinder 28, where it is melted into a plastic condition.

After passing the end of the torpedo, the stream of now relatively fluid material converges to the injection nozzle through which it enters the cavity of the mold.

The motion of piston 9 continues until the mold is completely filled with material under adequate molding pressure.

At this time the motion of piston 9 is arrested and the pressure produced by it on the material in the mold is retained for a sufficient period of time to permit the material to cool and harden or to set.

After this, pressure is released from the outer end of cylinder 4 and applied to the inner end of this cylinder to move piston 9 to the right, releasing its pressure on the material in the injection cylinder and thereafter withdrawing the end of plunger 15 to allow more material to drop from hopper 16.

After the release of the pressure on plunger 15, pressure is released from the outer end of cylinder 5 and is applied to the inner end of this cylinder, causing piston 50 to move to the left and pulling the mold sections 45 and 47 apart which permits the article which has been molded to drop from between these sections and slide down and out through the chute 60 where they may be received in any suitable container placed in front of the machine.

It will be understood that in molding thermosetting materials, the mold sections themselves may be equipped with heaters to furnish the heat necessary for the reaction of the material within the molds.

Fluid pressure is again admitted to the outer end of cylinder 5 to close the mold sections and then to the outer end of cylinder 4 to actuate the injection plunger, thus repeating the molding cycle.

The operations of admitting fluid to the cylinders and the control therefor is accomplished by parts of the apparatus within the base yet to be described.

If, for any reason, it is necessary to dismantle the nozzle or heating cylinder parts, the operator need only turn the hand screw 24 to loosen worm wheel 21 upon the threads of the bolt 20, so that the carriage 18 may be slid along bars 2 and 3. He then tightens hand wheel 42 to cause clamp sections 40 to grip the injection plunger 15 and admits fluid pressure to the inner end of cylinder 4, so that the outward motion of piston 9 retracts the entire carriage 18 and its associated parts, withdrawing the injection nozzle from the platen 38 and mold so that it is readily accessible.

After cleaning or repair, piston 9 can be caused to move inwardly to return the carriage 18 to its original position, where it is again clamped by actuation of hand wheel 24 and clamps 40 are released by the actuation of hand wheel 42.

Electric power is supplied for operating the apparatus from any suitable source, such as lines from an external power house, to a motor 61 positioned within the base 1.

Mounted on the shaft 62 of this motor are three pumps 63, 64 and 65. Pumps 63 and 64 are designed to operate at the same pressure, and pump 65 at a substantially higher pressure but to deliver much lower volume of fluid than the first two mentioned pumps.

The pumps are supplied with fluid from tanks 66 and 67, also within the base 1, through conduits 68 and 69.

From the discharge side of pump 63 fluid passes through a conduit 70 to a conduit 71.

A by-pass conduit 72 extends from conduit 70 to a hydraulic relief valve 73, from which the fluid may be returned by the conduit 74 to the tank 66.

At the juncture of conduits 70 and 72 is positioned a check valve 75 which prevents fluid being returned to the pump if the pressure in conduit 71 exceeds that of the fluid being discharged by pump 63.

The connections from pump 64 are similar to those of pump 63, consisting of an upwardly extending conduit 76 communicating through check valve 77 with conduit 71, there being a by-pass branch 78 from conduit 76 to a pressure relief valve 79 from which fluid may be returned by conduit 80 to tank 67.

The ends of conduit 71 communicate with two control valves, these being four-way valves associated with the cylinders 4 and 5, the valve at the left in the drawing and associated with cylinder 5 being indicated by the character 81 and that associated with cylinder 4 by the character 82.

Three outlets are shown from each valve.

From valve 82, a conduit 83 leads to the outer end of cylinder 4, a conduit 84 leads to the inner end of this cylinder, while a fluid return conduit 85 leads from the valve directly to the tank 66.

Similarly, from valve 81 a conduit 86 leads to the outer end of cylinder 5, a conduit 87 leads to the inner end of cylinder 5, and the conduit 88 communicates with the tank 67.

The outlet from pump 65 consists of a conduit 89 connected to conduit 86. A by-pass 90 extends from conduit 89 adjacent pump 65 to a pressure relief valve 91, which, in turn, is connected by a conduit 92 to conduit 80 through which liquid may be returned to tank 67.

Connected to conduit 86 is a pressure actuated switch 93 and a similar pressure actuated switch 94 is connected to conduit 83.

Two limit switches 95 and 96 are positioned adjacent the door 59 and are actuated by the door, so that they will be closed only when this door is in its protective position between the operator and the mold sections. Conveniently, one switch may be closed by the upper edge of the door and the other by the lower edge.

These switches are safety devices and are connected in series in the main control circuit, so that the device cannot be actuated unless the door is closed or unless the switches are held manually. Two of them are provided so that the operator cannot reach them both with one hand. If he wants to operate them manually, he must remove both hands from the machine. Otherwise, he must close door 59, so he cannot close the mold parts upon himself.

Three other limit switches are positioned on the machine, two being arranged for actuation by the motion of the mold closing piston rods or ram 51 and one by the motion of the injecting piston rod or ram 10.

The first is a limit switch 97 which is normally open and is closed only as the ram 51 advances the mold sections nearly to closed position. In actual practice, this switch may be adjusted to close its circuit only when the molds are not more than one sixteenth of an inch apart.

Another limit switch 98 is arranged to be actuated when the mold sections are fully separated. The remaining limit switch 99 is actuated by the piston rod 10 or plunger 15 when this plunger is retracted to its fullest extent.

Two time delay relays 100 and 101 are positioned within the base of the machine, the former relay being arranged normally to close one circuit and open another, but to open its first mentioned circuit and break its second mentioned one when it is energized, and the latter relay being arranged to close its circuit when energized.

The valve 81 contains two actuating coils or solenoids 81a and 81b. When coil 81a is energized the valve is moved into a position to permit fluid from pipe 71 to flow through pipe 86 to the outer end of cylinder 5. When coil 81b is energized, the valve is moved to the position in which liquid from pipe 71 passes through pipe 87 to the inner end of cylinder 5.

Similarly, valve 82 has two coils or solenoids 82a and 82b; when the former is energized, it permits liquid to flow from pipe 71 through pipe 83 to the outer end of cylinder 4, while when coil 82b is energized, fluid is directed through pipe 84 to the inner end of cylinder 4.

When neither of the coils or solenoids of either valve is energized, the valve assumes a neutral position in which the fluid from either end of pipe 71 is returned through pipes 85 and 88 to the tanks 66 and 67.

The control circuits for actuating the device are illustrated in Figure 3, which shows the main power lines bringing current to the apparatus at 102 and 103, these lines being connected to motor 61, which is provided with a control switch 104 by which the motor may be started or stopped independently of the control of the other parts of the apparatus. The motor operates continuously while the machine is in operation.

From conductor 103, a conductor 105 extends to switch 95, this being connected by conductor 106 to switch 96, from the latter of which extends a conductor 107 which branches to connect with the limit switches 97 and 99, the opposite sides of these last mentioned limit switches being connected together and to a conductor 108.

From conductor 107, a branch 109 extends to a push button 110 which is normally open, but may be manually depressed to close its circuit, and around which is shunted a hold-in 111. A conductor 112 extends from the push button to limit switch 98 and a conductor 113 connects this with one end of coil 81a of valve 81.

A conductor 114 extends from the other end of coil 81a to line 102.

Conductor 108 is connected to one of the contacts of time-delay relay 101, and from the other contact of this relay a conductor 115 connects with one end of coil 81b, the other end of this coil being connected to conductor 114.

Conductor 108 is also connected to one end of the coil of time-delay relay 101.

Wire 116 extends from the other end of the coil 101 to one of the normally open contacts of time-delay relay 100.

A conductor 117 connects the other normally open contact of relay 100 with one end of coil 82b of valve 82, the other end of this coil being connected to conductor 114.

The end of conductor 108 is branched, the branches terminating at a contact of pressure controlled switch 93 and at a contact of pressure controlled switch 94.

From the remaining contact of switch 93, a conductor 117 extends to one of the normally closed contacts of time-delay relay 110, while from the other normally closed contact a conductor 118 connects with one end of coil 82a.

The other end of coil 82a is also connected to conductor 114.

The remaining contact of pressure control switch 94 is connected to one end of the coil of time-delay relay 100, the other end of the coil being connected by conductor 119 to conductor 114.

The operation of the controls is as follows:

Assuming that pressure actuated switch 93 be set to close at 3,000 pounds per square inch, and that switch 94 be set to close its circuit when the pressure reaches 1,000 pounds per square inch, and starting with both rams 9 and 50 in their outermost positions, the operator closes switch 104 which starts the motor 61.

He leaves this switch closed, and, having supplied the hopper with sufficient granular material, he presses push button 110.

If he has forgotten to close the door 59, nothing happens, as switches 95 and 96 are open, so that he is protected against inadvertently operating the push button while making any adjustments on the mold.

However, assuming that the mold has been properly adjusted, and the door 59 closed so that switches 95 and 96 likewise are closed, current flows through the push button and through switch 98, conductor 113, coil 81a and conductor 114 back to line 102. The operator does not need to hold the push button, as immediately after he has pushed it, the hold-in 111 goes into operation and maintains the circuit complete.

The energization of coil 81a admits fluid from pumps 63 and 64 through pipes 71 and 86 to the outer end of cylinder 5, moving piston 50 to the right as seen in the drawing, until the mold sections have almost contacted, at which point switch 98 is opened, breaking the circuit through coil 81a.

This permits valve 81 to return to its neutral position where fluid being delivered through pipe 71 is returned to tank 67.

However, it does not stop the operation of pump 65 from delivering fluid to the cylinder, so that the piston continues to move to the right, although much more slowly, until its motion is arrested by the pressure of the mold halves upon each other. The pressure required in the initial closing movement is much less than that for which the switch 93 has been set, namely: 3,000 pounds per square inch, so pump 65 continues to deliver fluid until this pressure is reached and exceeded sufficiently to open the relief valve 91.

As soon as sufficient pressure is reached to close switch 93, current may flow in conductor 107, through switch 97, conductor 109, switch 93, conductor 117, conductor 118, to coil 82a.

This moves valve 82 into position to deliver fluid through pipe 83 into the outer end of cylinder 4, which moves piston 9 to the left as seen in the drawing, delivering a charge of material through the injection cylinder into the mold to fill the same.

The delivery of this material is continued until the resistance to the motion of the plunger 15 is sufficiently great to cause the pressure within pipe 83 to rise and actuate switch 94. (In the example under consideration 1,000 pounds per square inch.)

As soon as switch 94 closes, current flows from conductor 108 through the coil of time-delay relay 100, conductors 119 and 114, back to line 102.

This causes the time-delay relay to operate, breaking the circuit through coil 82a and completing the circuit through coil 82b.

The time required by the time-delay relay may conveniently be of an order of a few seconds, possibly ten, at the end of which the armature of relay 100 moves to the left and current passes from conductor 108 through the coil of time-delay relay 101 through the left hand contacts of time-delay relay 100, conductor 117, coil 82b, conductor 114, back to the line 102.

The energization of coil 82b moves valve 82 to deliver fluid under pressure to the inner end of cylinder 4, moving piston 9 out (or to the right as seen in the drawings) and thus preparing the apparatus to receive another charge of material as well as relieving any pressure on material present in the injection cylinder.

Shortly thereafter, the time being controlled by time-delay relay 101, this latter relay closes its contacts permitting current to flow through conductor 108 to conductor 115, thence through coil 81b to conductor 114, actuating valve 81 to admit fluid to the inner end of cylinder 5 and starting the motion of piston 50 to the left, which motion opens the mold parts and permits the molded articles to drop into the chute 60.

When piston 9 reaches the outer end of its stroke, it opens limit switch 99, and as soon as piston 50 reaches the outer end of its stroke it opens limit switch 97, and these two, being in parallel, break the circuit between conductors 107 and 108, deenergize coils 81b and 82b, so that the parts have completed the cycle of operation and are ready for the operator to start it over again by pushing button 110.

If it be desired that the machine shall go through the cycle automatically, it is only necessary to position the button 110 where it may be depressed by the mold-closing ram 51 on reaching its outermost position, which in effect turns the push button into another limit switch, making contact at the same time that limit switch 97 breaks the contact through its circuit.

From the above, it will be apparent that in case of failure of any of the parts of the apparatus, the device is stopped and so is extremely safe.

The injection plunger cannot be moved toward the mold until the latter has been closed and the pressure behind its piston had risen to a point where it will close switch 93.

In the instance above discussed, the pressure of 3,000 pounds per square inch insures against the injection of any material while the mold is partly open. Should the pressure holding the mold closed drop during the injection process, switch 93 opens and breaks the circuit controlling the injection plunger.

The pressure is held on the molded material by the control througth switch 94 until this pressure has reached the amount for which this switch has been set, so that all articles are uniformly molded.

The time-delay relay 101 insures the start of retraction of the injection plunger before the mold can commence to open, while the time-delay relay 100 insures holding the pressure on both injection and mold pistons for a predetermined time which is adequate to allow the material to harden.

As previously pointed out, the switches 95 and 96 preclude the operator from operating the device at all until the protective window is closed in front of the mold.

While I have described the illustrated embodiments of my invention in some particularity, obviously many other embodiments, modifications, and variations will readily occur to those skilled in this art, and, therefore, I do not limit myself to the precise details described herein, but claim as my invention all embodiments, modifications, and variations coming within the scope of the appended claims.

I claim:

1. An injection molding machine comprising a frame, a mold carried by the frame, an injection cylinder movably carried by the frame, an injection piston, driving means for reciprocating the injection piston within the injection cylinder, clamping means releasably clamping the injection cylinder to the frame, and clamping means releasably clamping the injection cylinder to the injection plunger.

2. An injection molding machine comprising a frame, a stationary holder carried by the frame, a mold section secured to the holder, a second mold section co-operating therewith, a movable support for said second mold section carried by the frame, moving means connected to said second support and arranged to move it toward and from the first mentioned support, an injection cylinder movably carried by the frame and having an outlet movable into engagement with the first mentioned mold section, an injection plunger reciprocable in said injection cylinder, moving means connected to said plunger, a manually operable clamp between the injection cylinder and the machine frame, and a second manually operable clamp between the injection cylinder and the plunger.

MORTON A. BAUMAN.

REFERENCES CITED

The following references are of record in the file of this patent:

UNITED STATES PATENTS

| Number    | Name       | Date           |
|-----------|------------|----------------|
| 2,107,190 | Shaw       | Feb. 1, 1938   |
| 2,187,212 | MacMillin  | Jan. 16, 1940  |
| 2,246,414 | McIntyre   | June 17, 1941  |
| 2,277,640 | Harrington | Mar. 24, 1942  |
| 2,304,461 | Knowles    | Dec. 8, 1942   |
| 2,318,031 | Tucker     | May 4, 1943    |
| 2,355,613 | Wacker     | Aug. 15, 1944  |
| 2,372,833 | Jobst      | Apr. 3, 1945   |